Dec. 16, 1958   H. Z. GORA   2,864,123
MOLDING METHODS AND APPARATUS
Filed April 17, 1952   6 Sheets-Sheet 1

INVENTOR
*Henry Z. Gora*

BY
*Johnson and Kline*
ATTORNEYS

Dec. 16, 1958 H. Z. GORA 2,864,123
MOLDING METHODS AND APPARATUS
Filed April 17, 1952 6 Sheets-Sheet 2

Fig. 2

INVENTOR
*Henry Z. Gora*

BY *Johnson and Kline*
ATTORNEYS

Dec. 16, 1958 — H. Z. GORA — 2,864,123
MOLDING METHODS AND APPARATUS
Filed April 17, 1952 — 6 Sheets-Sheet 3

INVENTOR
Henry Z. Gora
BY Johnson and Kline
ATTORNEYS

Dec. 16, 1958   H. Z. GORA   2,864,123
MOLDING METHODS AND APPARATUS
Filed April 17, 1952   6 Sheets-Sheet 4

INVENTOR
Henry Z. Gora.
BY
Johnson and Kline
ATTORNEYS

Dec. 16, 1958　　　H. Z. GORA　　　2,864,123
MOLDING METHODS AND APPARATUS
Filed April 17, 1952　　　6 Sheets-Sheet 5

INVENTOR
Henry Z. Gora
BY Johnson and Kline
ATTORNEYS

Dec. 16, 1958 H. Z. GORA 2,864,123
MOLDING METHODS AND APPARATUS
Filed April 17, 1952 6 Sheets-Sheet 6

INVENTOR
Henry Z. Gora
BY
Johnson and Kline
ATTORNEYS

United States Patent Office 2,864,123
Patented Dec. 16, 1958

2,864,123

MOLDING METHODS AND APPARATUS

Henry Z. Gora, Stratford, Conn., assignor, by mesne assignments, to The Eagle-Picher Company, Cincinnati, Ohio, a corporation of Ohio Application April 17, 1952, Serial No. 282,795

28 Claims. (Cl. 18—5)

This invention relates to methods and apparatus for molding articles of plastic material.

In my prior Patent No. 2,548,306, dated April 10, 1951, there is disclosed the method of molding articles including the steps of plasticizing material, producing an endless strip thereof, and passing the latter between pairs of cooperating die members which blank material from the strip and mold it to shape. When, as illustrated in said patent, the dies are on the periphery of adjacent drums, the time during which the cavity of each die is closed is extremely short (when the apparatus is operated at practical speeds) with the result that the material is not subjected to the heat of the dies long enough to permanently set it in shape, and slight distortions of the article occur while they are being cured out of the die cavity, in a curing oven for instance. For many kinds of articles, such as nail washers, garter buttons, etc., such distortions do not interfere with the proper functioning or use of the article.

To permit more precise molding of articles, I have devised methods and apparatus in which the material is kept in the heated die cavity for a relatively longer period of time. This is accomplished by providing a series of pairs of axially aligned die members traveling in a closed path (being mounted on a wheel or drum for instance), guiding a strip of plasticized material longitudinally into a space between the open die members, and then closing the die members on the strip to blank out and mold a portion of the strip in the heated die cavities which are closed during more or less of the travel of the die members in their cycle of movement to set the material to desired shape and size.

One species of my invention is disclosed in my Patents Nos. 2,593,438 and 2,593,668, granted April 22, 1952, in which the die members are closed on the strip of molding material and remain closed carrying the impaled strip along with them until the die members are separated and the articles discharged therefrom. For certain articles and under certain conditions this method is efficient and high production can be obtained with relatively inexpensive apparatus.

In another species of my invention, that disclosed and claimed herein, by making a larger wheel and increasing the number of pairs of die members and thus prolonging the time during which the material in the die cavity is subjected to heat and pressure, without proportionately reducing the production rate, I am able to produce in satisfactory quantities molded articles more precise and uniform than has heretofore been possible with multi-cavity platen molding, albeit the apparatus costs more to produce than that shown in my said patents, but a greater variety of precision molded articles may be produced by its use.

In the hereindisclosed method and apparatus, the strip of plasticized material follows the path of the die members for only long enough to bring the die members together on the strip and blank out therefrom a quantity of the material and deposit it in the die cavity. Within a short time the die members are separated and the strip is guided out of the path of the die members leaving the blank in one of the cavities. This has the practical advantage of avoiding the partial curing of the skeletonized strip which would occur in prolonged contact with the heated die members and thus the strip may remain reusable. After the strip is removed, the die members are closed under resilient yielding pressure and the blank or slug in the cavity responds to the heat of the die members and flows to fill the cavity and in its prolonged confinement in the cavity becomes semi-cured to a degree where, upon discharge from the cavity and further curing in an oven, the article will maintain its desired shape and size.

The duration of this semi-curing operation depends on the kind and the formulation of the material used, the volume of the piece molded and its thickest cross-section, and the temperatures to which it may be exposed without scorching. The size of the apparatus, i. e. the length of the path of the die members and their speeds of travel, may be calculated to obtain satisfactory semi-cure at the desired economically efficient rate of production.

The thickness of the plastic strip (controlled by the warming mill rollers in the embodiment of the invention herein illustrated) is predetermined to produce a blank or slug having a mass before responding to the prolonged heating effect of the die members slightly in excess of that needed to fill the cavity and form the desired article. With many kinds of articles the contacting surfaces of the cavity forming parts of the die members are capable of removing from a strip of practical or optimum thickness a blank of the desired mass.

To meet the situation where the article to be molded requires a blank of greater mass than can be so formed, I have devised a method and apparatus in which the material of the strip over an area substantially greater than the contacting surfaces of the die members is extruded from the plane of the strip into a confined passage and is injected through such passage to the die cavity. As the die members are being brought together to fill the cavity, the excess material is permitted to flow through the confined area backwardly to the strip to which it has remained united. When the die members are closed, contacting surfaces thereon cut off the blank from the excess material and the die members may be opened to release the strip and the excess material extruded from but remaining attached to the strip which is then removed from between the dies leaving the blank in a cavity in the die. If, however, only a blank is to be molded, it too may be discharged immediately from the cavity; but, if the blank is to be molded to finished form and semi-cured, the die members are immediately again closed on the blank and maintained closed for a predetermined length of time.

I have found it advantageous to relieve the pressure of the die members on the blank one or more times after the blank is initially formed by the dies to permit the escape of any gas or air which may be trapped in the cavities and to permit excess material to easily flow past the cut-off surfaces. Such excess material remains attached to the strip and is removed therewith.

It has been long desired to mold an article such as a faucet washer or O ring with a hole clean through, i. e., without a closing wall. I have devised several ways of accomplishing this which will be described below.

I have also devised an efficient mechanism for opening, closing and holding the die members closed whereby each pair of die members is individually controlled both as to their positive action and their resiliently yielding action.

The die members are preferably carried by a heated portion of the drum while the operating mechanism therefor is carried by a portion of the drum which is not intentionally heated and preferably should be as cool as possible to maintain the parts properly lubricated. I have devised a unique way of securing these two drum parts together in poor heat conducting relation.

These and other features and advantages of the present invention will be described below.

In the accompanying drawings which illustrate several embodiments of this invention.

Figures 1, 1A:
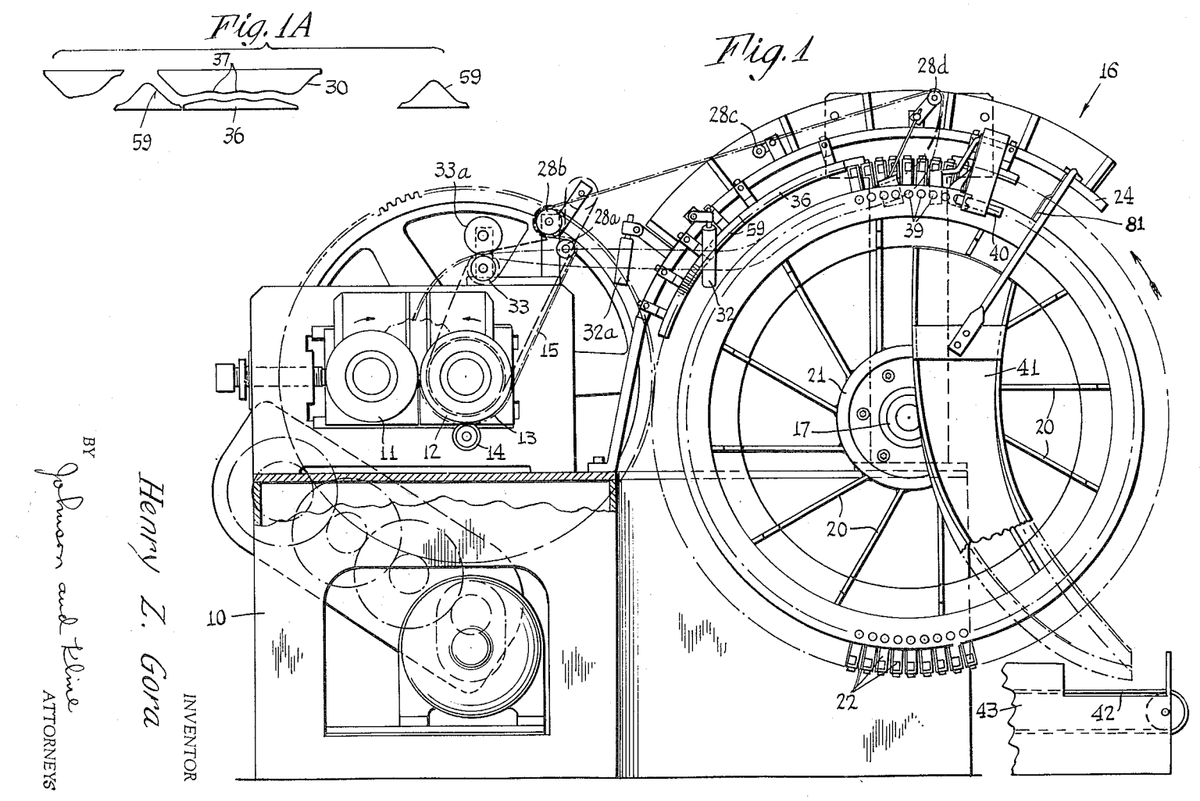
Figure 1 is a side elevation, partly in section, of the apparatus of the present invention.
Fig. 1A is a diagrammatic view showing the outline of the cams for performing the various operations.
Figure 2:
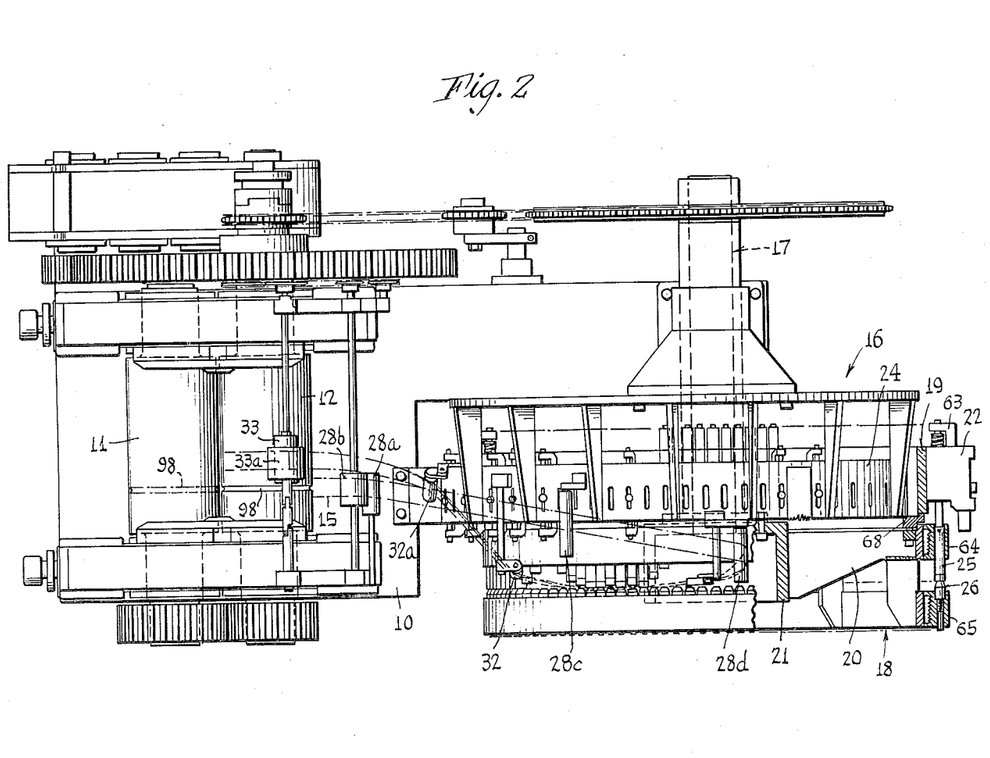
Fig. 2 is a plan view of the apparatus, also partly in section.

As shown in the accompanying drawings, the apparatus of the present invention comprises a frame 10 at one end of which is mounted a pair of mill rollers 11 and 12 on which a quantity of moldable material such as rubber or similar material may be plasticized and form on the roller 12 an enveloping layer 13 of determinate thickness controlled by the spacing between the mill rollers. Cutters 14 remove from the layer 13 a strip 15 of determinate width, the void resulting in the layer 13 being constantly filled by migration of the material in the bank so that the strip 15 is continuous so long as the bank is maintained and the machine is operated.

At the other end of the frame there is a drum-like structure 16 mounted on a horizontal shaft 17 and rotating in a vertical plane. The drum 16 is formed of two parts 18 and 19, the part 18 having spokes 20 extending from a hub 21 and the part 19 being in the form of a ring carried by the part 18. The part 19 has removably mounted on its periphery a series of operating units 22 closely spaced and each including a cam follower 23. Secured to the frame and overlying the drum part 19 for a large arc of the latter's movement is a cam support 24 on which a plurality of cams are adjustably mounted in position to be engaged by the follower 23 as the drum rotates. Mounted on the part 20 of the drum is a series of pairs of coaxially aligned die members 25 and 26 which may be separated and brought together.

As shown, the die members 25 are mounted to move axially toward the die members 26 and each is connected to an axially aligned operating unit 22 by which it is operated when the cam follower 23 reaches and is operated by the cams of the cam support 24 during the rotation of the drum. The die member 26, in the embodiment of the invention herein illustrated as exemplary thereof, is mounted so as not to be movable for molding purposes.

In the open position there is a space 27 between the die members 25 and 26 and it is into this space that the strip 15 is guided from the mill roller by guides 28a, 28b, 28c and 28d set at such angles that the horizontally disposed strip is twisted to lie in a vertical plane and to enter the space 27 between the die members substantially tangentially to the path of the die members. When so located, movement of the die member 25 to closed position engages the strip 15 and presses it against the die member 26 with sufficient force to sever a blank 29 from the strip and deposit it in the die members. At the same time the strip 15, which is somewhat wider than the working ends of the die members 25 and 26, is impaled on the die member which penetrates it and is carried around with the drum by the die member. When the material being molded is to be semi-cured, the die members 25 and 26 are heated by conduction or otherwise through their supporting means in a manner hereinafter explained.

According to the present invention the strip 15 is carried along with the die members only so long as is necessary to control the strip and partially form the blank. Hence the die-closing cam 30 is of such length and so positioned that after a few succeeding die members have impaled the strip 15, the movable die member 25 recedes and opens the space between the die members and the strip 15 is stripped from the die member 25 by a stripper after which the strip is guided from the path of the die members by guide rollers 32, 32a and is traveled back to the bank on the mill rollers to there commingle with the bank, the strip being assisted in its return movement by power driven feed roller 33 and pressure roller 33a engaging it.

By thus quickly removing the skeletonized strip 15 from the die members the danger of partially curing the material of the strip by prolonged contact with the heated die members is avoided and the strip is returned to the mill at substantially the same temperature as that at which it left.

The short period during which the die members are closed to form the blank is not always sufficient to set, or in the parlance of the art "kill the nerve" of the material, and precision molded articles are not thus produced although for making such articles as nail washers, garter buttons, etc. it is sufficient and the articles can be immediately discharged from the molding cavity.

However, according to the present invention in order to perform precision molding, as soon as the strip 15 is removed, leaving the blank in the cavity of one of the die members, the die member 26 in the form shown, the movable die member is again moved to cavity closing position by another lobe on the cam 30 so that the blank may be subjected to heat while confined in the molding cavity between the die members 25 and 26 for a prolonged period sufficient to cause the material to flow and fill the cavity (and overflow if necessary during its heating up) and become semi-cured to the degree in which it will maintain its shape and size after being discharged from the die cavity and may be, as taught in my prior Patent No. 2,548,306, completely cured or vulcanized in an oven.

According to the present invention in its preferred form the article is not discharged from the die members 25 and 26 until the die members are opened to receive the strip 15, since, considering the speed of the drum, if the semi-curing step should require less time than is required to bring the article curing dies to open strip-receiving position the speed of rotation of the drum may be increased, thus increasing the rate of production.

As is the practice in conventional molding processes the timing of the operations should take into consideration the usual factors including the kind of material used, its formulation, the volume of the article, the maximum cross-sectional thickness thereof, the hardness desired and the safe temperatures at which the material may be processed.

After the die members are closed on the blank the latter expands and tends to overflow the cavity, escaping past the cut-off surfaces 34 at the parting line of the die members. This is permitted, according to the present invention, when the pressure within the cavity reaches a determinate value by the yielding of a spring 35 in each operating unit which, as hereinafter explained, permits the movable die member to back off slightly from the fixed die member. When the pressure is released due to the escape of the material, the spring 35 returns the movable die member 25 to the fixed die member 26 and the overflow of the material in the cavity is cut off.

To facilitate the escape of excess material when the blank is initially formed, the cam 36 is positioned and shaped to retract and advance slightly the movable die member 25 one or more times as the heating of the blank progresses, the cam 36 having undulations 37 for this purpose. The repeated opening and closing of the molding dies by the cam 36 also affords an opportunity for air or other gases which might be trapped in the cavity to escape and the excess or overflow material is allowed to remain attached to the strip 15 which during these repeated retractions is still carried along with the die members.

After the cavity is opened by retraction of the movable die member 25 just before the next blank is formed the molded article is ejected from the fixed die member 26 carrying it. At the time the die member 25 is retracted any flash material between the contacting or cut-off surfaces of the dies is free to fall away as the molded article is ejected. Any flash material clinging to the molded article is readily separated therefrom in a tumbling operation since it is extremely thin and only loosely attached. For the purpose of so ejecting the article the fixed die member 26 is provided with an axially disposed ejector plunger 38 having an extension 39 to be engaged by a cam 40 carried by the frame of the machine. As the drum 16 revolves the extension 39 on the ejector 38 engages the cam 40 and the article within the fixed die is pushed from the cavity. The ejected article falls through the space between the die members 25 and 23 and between the spokes 18 of the drum onto a chute 41 which guides it to the end of a conveyor belt 42 within a tunnel 43. The tunnel 43 is heated to vulcanizing temperature and the belt is traveled at such a speed that by the time a molded and semi-cured piece reaches the end of the tunnel it will be vulcanized.

Figures 3, 4, 5:
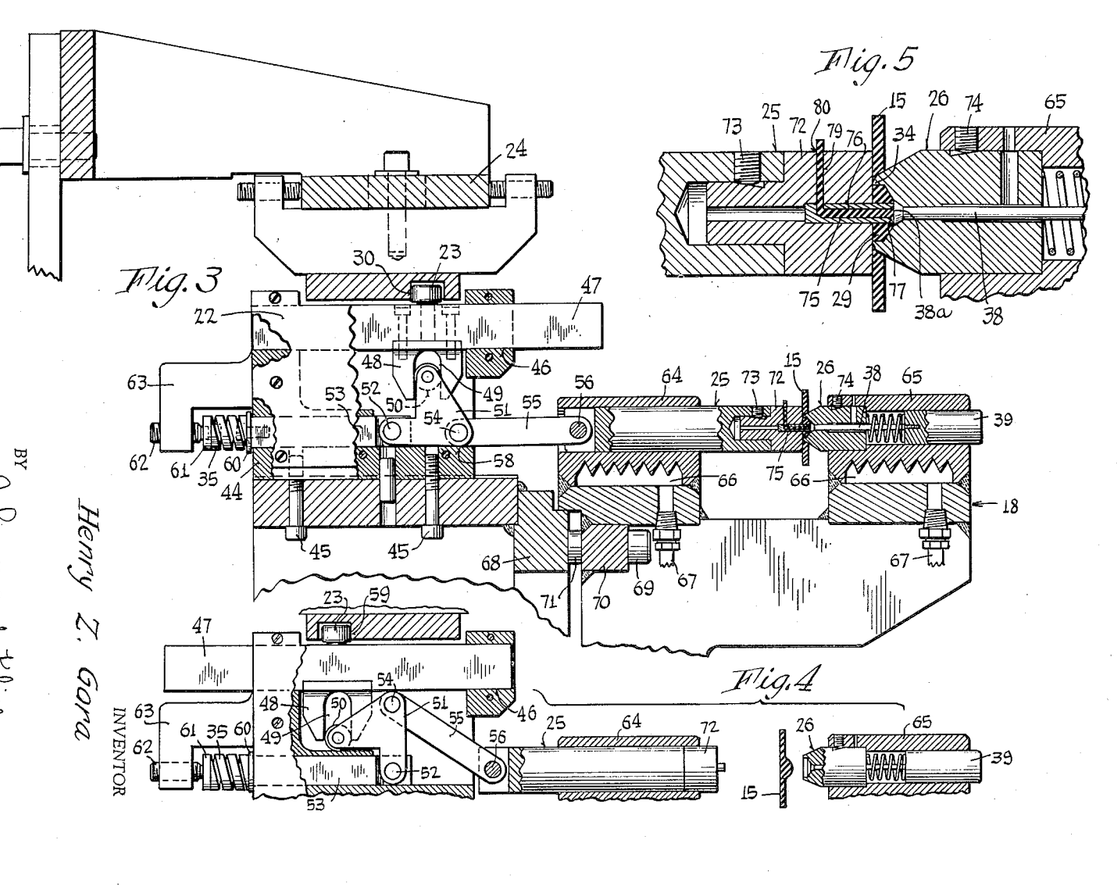
Fig. 3 is a fragmentary sectional view taken through the drum and showing the cooperating die members and the associated operating unit in die-closing position.
Fig. 4 shows the die members and the operating unit in position with the movable die member retracted.
Fig. 5 is an enlarged view of the operating ends of the die members showing one way of producing a hole clean through the molded article.
Figures 19, 21, 23:
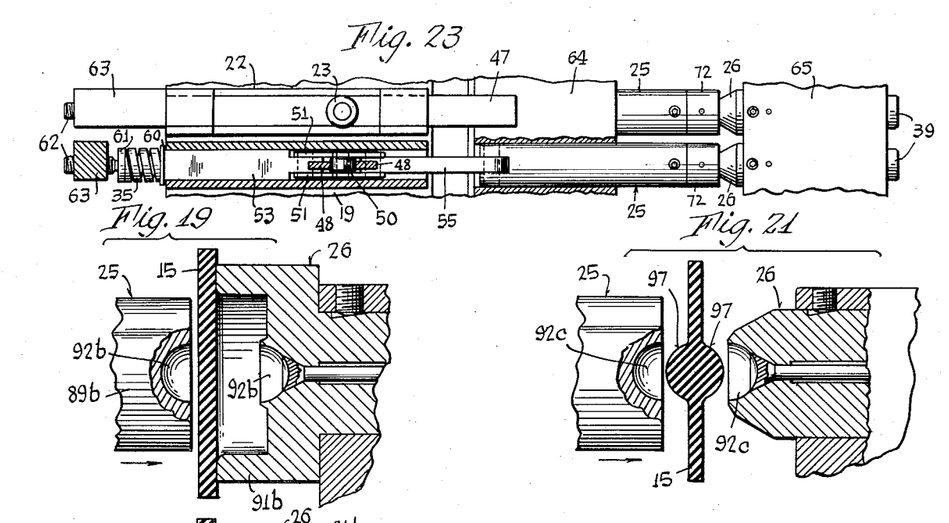
Fig. 19 shows the working ends of the fixed and movable dies arranged to mold a solid article of relatively thick cross-section, such as a ball.
Fig. 21 shows a modified form of strip of moldable material suitable for making articles of substantially thick cross-section and illustrating the working ends of the die members for use therewith.
Fig. 23 is a plan view on a larger scale than Fig. 2, of two adjacent operating units showing one in section.

The operating unit 22 comprises a separate subframe or housing 44, the base of which is removably secured by bolts 45 to the part 19 of the drum in substantial alignment with the axis of the die members 25, 26. The upper portion of the housing 44 has a guideway 46 to receive a slide bar 47 carrying a cam follower roller 23 for engagement with the cam 30 carried by the cam support 24 mounted on the frame. The lower part of the slide bar 47 carries a block 48 having a vertical slot 49 in which rides a roller 50 on a bell crank 51. The bell crank 51 has a pin 52 carried by a bar 53 constituting the relatively fixed pivot point of the bell crank. The bell crank 51 has a pivotal connection 54 with a link 55 pivotally connected at 56 to the die member 25 which reciprocates in a ring 64 forming part of the drum part 18. When the slide bar 47 is in the position shown in Fig. 4 the die member 25 is retracted and when it is moved by one of the cams to the right as shown in Fig. 3, the die member 25 is advanced and the pivotal connections 52, 54 and 56 between bar 53, the bell crank 51 and the link 55 are brought into alignment so that any force tending to push the die member 25 to open position will necessarily have to move the pivot point 52 for the bell crank, since the latter and the link constitute a toggle which is locked in the extended or cavity closing position of the die member. Preferably, the bell crank 51 throws its pivotal connection 54 with the link 55 slightly beyond a straight line drawn between the pivot point 52 and the pivot point 56 on the die member 25 where it comes to rest against an abutment surface 58. In this position the toggle is self-locked and will remain so without the follower roller 23 engaging the cam 30, and thus the load of keeping the toggle locked does not have to be sustained by the stationary cam with the resulting continuing work and friction, but is sustained entirely by the drum 16 which, of course, rotates with the operating unit. To unlock the toggle, the follower roller 23 is engaged by cam surfaces 59 on the other side of it to move it to the left as shown in Fig. 4.

To maintain the die cavity closed under yielding resilient force, the rod 53 on which the pivot point 52 for the bell crank 51 is mounted is slidably mounted in the housing 44 of the unit. The end of the rod has a head 60 extending beyond the housing and normally engaging it to limit the inward movement of the rod. Engaging the head is the coil spring 35, the other end of which engages a head 61 mounted on a screw 62 threaded in an extension 63 of the housing 44. When the die is closed, any force acting to open it, for instance the expansion of the material contained within the die cavity, is transmitted through the link 55, bell crank 51 and pivot point 52 to the rod 53, which may be moved under the yielding resiliency of the spring 35. When the force is released the spring 35, acting through the parts just named, will return the die member 25 to cavity closing position. The same action takes place when the die member 25 is initially closing on and penetrating the strip 15 of molding material, for if the resistance to penetration is too great considering the speed of movement, the spring 35 will initially yield and then return to its normal position when the material has had sufficient time to squeeze out from between the movable and immovable die members. The spring 35 also permits the slight recession of the pivot point 52 of the bell crank when the connecting pivot 54 between the bell crank 51 and the link 55 passes over dead center.

Thus it will be seen that the spring 35, besides acting as a safety feature to prevent damage to the die members which might be caused by pressing them together with unyielding force, also serves as a follow-up device to close the dies when the resistance to the movement of the movable die ceases.

It will be observed from Fig. 3, that rings 64 and 65 on the part 18 of the drum carry the fixed and relatively movable die members and that these have chambers 66 which are connected by pipes 67 to a swivel connection for steam or other temperature controlling fluid. When molding rubber or other thermoplastic material, steam is used and the rings become hot. To avoid conduction of heat from the major portion 18 of the drum to the part 19 carrying the operating units 22, the actual physical contact between the part 18 and the part 19 is reduced to a minimum. This is accomplished in the apparatus illustrated by having a small portion of a flange 68 on the part 19 fit within the ring 64 on the part 18 to locate it and passing bolts 69 through lugs 70 on the ring 64 into holes in the flange 68, spacing washers 71 being interposed between the ring and the flange to further reduce the area through which heat may be conducted from one to the other. This enables the operating units to be lubricated without the difficulties caused by high temperatures.

To permit the rapid conversion of the machine from the manufacture of one product to that of another of different size or shape, the movable die member 25 includes a removable die head 72 which may be secured in the main body of the die member 25 by means of a locking screw 73 while the fixed die member 26 is itself removably mounted in the ring 65 and is held in its position by a locking screw 74. Thus, either the die head or the immovable die member or both may be removed by merely loosening the set screws holding them in place, slipping them off their supports, and substituting other parts and holding them in place by tightening the set screw.

To solve the problem of molding elastic articles with a clean hole therethrough (such as the screw hole in the center of a bibb washer), the present invention provides a hole-forming rod or projection 75 in one of the die members with a recess 76 in its end, leaving only a very narrow cut-off surface 77 defining the inner wall of the hole to be formed. When the die members are closed and the rod abuts its opposing surface 38a on the other die member, the molding material unavoidably lying between the cut-off surface 77 at the end of the rod and its abutment is squeezed out leaving the hole, when the die members are separated, open clear through with little or no flash clinging to the margin of the hole.

The material lying inside the cut-off surface 77 may either be squeezed out by application of yielding pressure or may be retained within the recess 76 to be disposed of in some way.

In the embodiment of the invention illustrated in Fig. 5, the recess 76 in the rod communicates with a passage 79 extending through the die member to an outlet 80. By this arrangement, molding material trapped within the cut-off surface 77 is forced through the passage 79 accumulating until it projects through the outlet as an extrusion where it is knocked off by a finger 81 (Fig. 1) located in the path of the die members.

Figure 13:
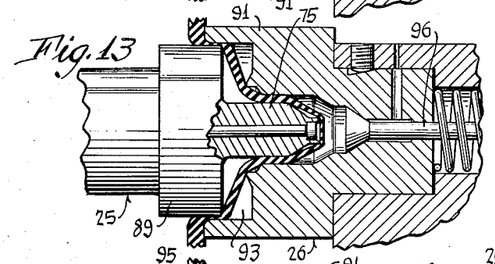
Fig. 13 is a view of the parts shown in Fig. 12, with the die members partially closed.
Figure 14:
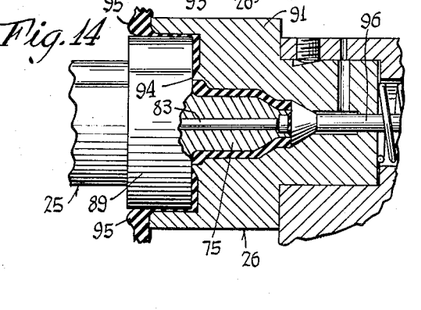
Fig. 14 is a view similar to Fig. 13, with the die members closed.
Figure 15:
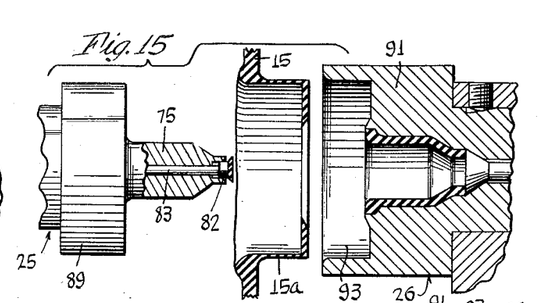
Fig. 15 is a view of the parts shown in Figs. 12, 13 and 14, with the die members opened and the strip of moldable material from which the article was formed stripped from the die, the article remaining in the die.

In the embodiment shown in Figs. 12 to 16, the recess 76 in the hole-forming projection 75 contains an ejector 82 on a rod 83 which is operated by a suitable cam in the path of the rod 83 to eject the excess material trapped within the cut-off surfaces after the die members are separated as shown in Fig. 15.

Figures 6, 6A, 7, 8, 9, 9A, 10, 11:
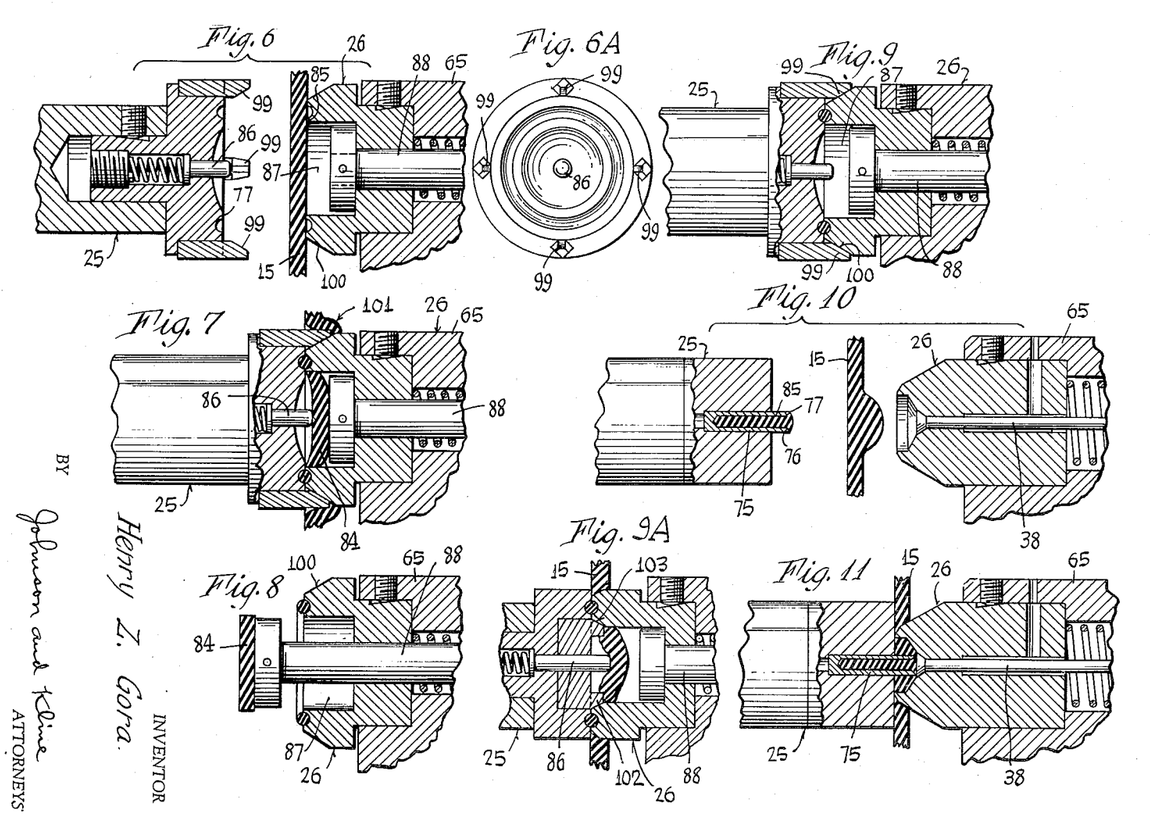
Fig. 6 is a detail view showing die members for forming generally annular articles such as O-rings, and for removing the disk or center portion from the blank, said members having external or outwardly disposed registering or aligning means.
Fig. 6A is a face view of the left die member shown in Fig. 6.
Fig. 7 is a view of the parts shown in Fig. 6, with the die members closed.
Fig. 8 is a view of one of the die members showing the center portion of the blank being ejected while the partly molded article is retained in the die member.
Fig. 9 is a view of the parts shown in Figs. 6 and 7, with the die members again closed to continue the molding and semi-curing of the article in the die member.
Fig. 9A is a view like Fig. 7, but showing modified forms of die members characterized by inwardly disposed aligning or registering means therefor.
Fig. 10 is a view similar to Fig. 6 showing another form of the present invention in which the portions of the material (which would otherwise close the end of the hole in an article) is extruded by a cushioned action from under the hole-forming rod.
Fig. 11 is a view of the parts shown in Fig. 10, with the die members closed.

In the embodiment shown in Figs. 10 and 11, the recess 76 has a communicating channel 85 which has a blind end. After the channel 85 and recess 76 are filled by an accumulation of the excess material trapped within the cut-off surfaces 77, the resilient material bulging from the recess acts as a yielding pad which squeezes the molding material lying under the end of the filled rod 75 outwardly past the cut-off surface 77 as the die member 25 approaches the end of its cavity-closing movement. The result is that the hole in the molded article is free of any hole-closing material.

When, as in molding O-rings, the material trapped within the cut-off surfaces is a substantial portion of the blank severed from the strip 15, a somewhat different arrangement from those above described may be employed. For instance, as shown in Figs. 6 to 9A, the die member 25 has the cut-off surface 77 while the opposing surface on the die member 26 is in the form of a very narrow cut-off surface 85. The latter is positioned to meet the companion cut-off surface 77 on the die member 25 at the smallest inside diameter of the article, for instance, the inner diameter of the O-ring, and the disk 84 of molding material trapped within the cut-off surfaces is pushed away from the parting line by a spring pressed plunger 86 on the die member 25 into a recess 87 in the die member 26. When the die members are separated, the disk 84 is ejected from the recess 87 by an ejector 88.

The cut-off surfaces 77 and/or 85 may be flat, perpendicular to the axis of movement of the movable die member and in the order of .005″ wide. Hence, if any molding material should remain under the cut-off surfaces, the flash would be extremely small and could be easily removed by abrasion or mere contact if objectionable.

When, as sometimes occurs, the quantity or mass of the blank to be taken from the strip is in excess of that which would be blanked by the working ends of cooperating die members unless the strip were made excessively thick, methods which I have devised and which will now be described may be advantageously used.

Figure 12:
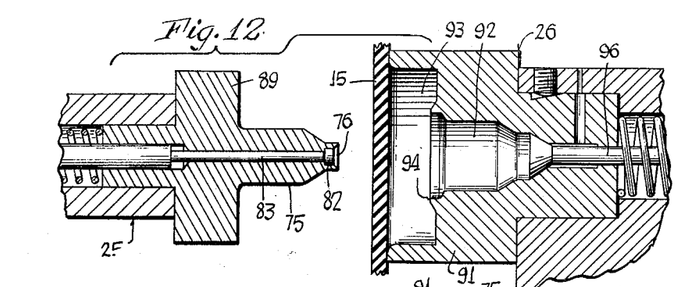
Fig. 12 is a view of the working end of fixed and movable die members in which the die cavity is filled by causing material of the blank to be ejected into the cavity.

As shown in Figs. 12 to 14 and 17 and 18, the cooperating die members 25 and 26 may be provided with a coacting plunger and cylinder substantially larger than the working ends of the die and surrounding the same. As shown in Figs. 12 to 14, a plunger 89 may be carried by the male cavity-forming member 75 of the die member 25, while a cylinder 91 may be carried by the die member 26 having a recess 92. When the die members are brought together, the male member 75 pushes the material from the strip into the cylindrical recess 91 and at the same time, as shown in Fig. 13, the plunger 89 enters the cylinder 91 and forces the material of the strip down into the cavity 93. As the closing movement continues the material in the cavity 93 is caused to flow into the article-forming cavity between the male member 75 and the recess 92, and, as the die members approach the end of their closing movement, the material within the cavity 93 is extruded into the die-forming cavity so as to insure the filling of the same until finally the die cavity is closed by the engagement of the cut-off surface 94 with its companion abutment.

So that the volume of the blank taken from the strip need not be too accurately determined and in order to permit the material within the die cavity to expand upon being heated as the die members close, the plunger 89 does not tightly fit the cylinder 91 but is spaced therefrom a slight distance. This space is small enough to prevent the material trapped in the cavity 93 from flowing backwardly during the initial movement of the die member 25 until the cavity 93 and the article-forming cavity are filled, but large enough to permit the back-flow of material in excess of that necessary to fill the article-forming cavity and the remaining portion of the cavity 93 when the dies are closed. Such excess material may bulge out the strip as shown at 95 in Fig. 14.

The spacing of the plunger 89 and the cylinder 91 has the further advantage of permitting the material remaining in the cavity 93 and in the space between the plunger and the cylinder to remain attached to the ribbon. Thus, when the die members are separated as shown in Fig. 15 and the strip 15 is stripped from the die 26, the excess material, shown in the form of a cup 15a, remains attached to the strip 15 and may return with it to the source from whence it came.

Figure 16:
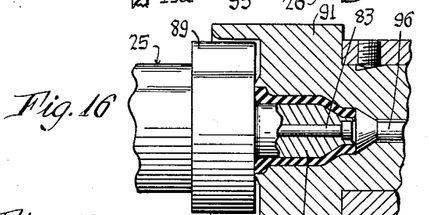
Fig. 16 shows the die members closed after the strip of molding material has been removed so that the molding and curing of the piece within the die can be continued.

The dies are separated before the excess material has an opportunity to cure. After removal of the strip 15 the die members are brought together again as shown in Fig. 16 to complete the molding of the article and semi-cure it. When the dies are again separated, the molded article may be ejected from the die 26 by an ejector 96. As explained above, in the form shown the article is molded with a hole clear through by reason of the recess 76 formed in the end of the projection 75.

Figure 17:
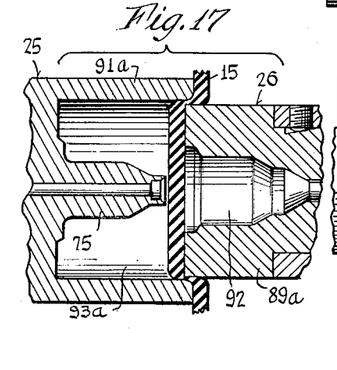
Fig. 17 is a modified form of the arrangement shown in Fig. 12, in which the part of the strip of moldable material to be used is trapped between the die members before it is otherwise engaged by the cavity-forming parts of the die members.
Figure 18:
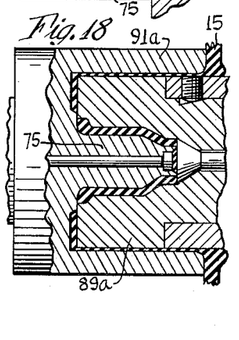
Fig. 18 is a view of the parts shown in Fig. 17 in die-closing position.

If it is desired to displace the blank from the plane of the strip before the cavity-forming parts of the die engage the strip, the arrangement shown in Figs. 17 and 18 may be employed. As shown in Fig. 17, the plunger 89a is formed on the die 26 having the recess 92 while the cylinder 91a is carried along with the male member 75 on the die member 25. The end of the male member is below the plane of the ends of the cylinder 91 so that, except for the slight space between the plunger 89a and the cylinder 91a, the blank is trapped within the cavity 93a before the male member 75 engages the strip and is pushed down over the male member to the die-closing position shown in Fig. 18, in which the excess material flows back through the remaining portion of the cavity 93a and the space between the plunger and cylinder.

Figure 20:
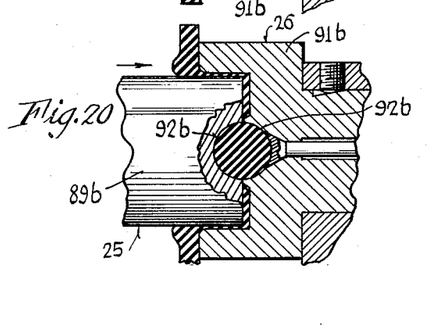
Fig. 20 is a view similar to Fig. 19, showing the parts in die-closing position.

The same general arrangement as that disclosed in Figs. 12 to 19 may be employed with advantage in molding articles having relatively thick cross-sectional areas, such as a ball or other solid thick piece. For instance, as shown in Figs. 19 and 20, the member carrying the plunger 89b and the member carrying the cylinder 91b may both have article-forming recesses 92b. The area of the plunger 89b is predetermined to displace from the blank a sufficient quantity of material so as to fill the cavities 92b when the die members are brought together as shown in Fig. 20 and leave sufficient excess to back-flow through the space between the plunger and the cylinder as the material expands and the dies close.

Figure 22:
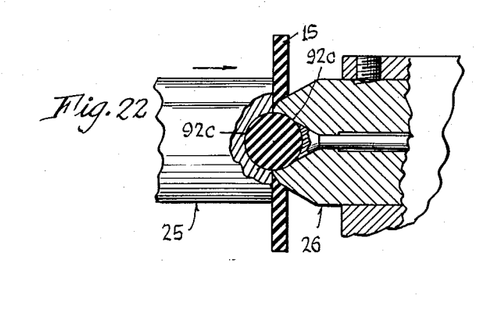
Fig. 22 is a view of the parts shown in Fig. 21 in cavity-closing position.

Another way of molding relatively thick articles such as balls is shown in Figs. 21 and 22. According to this aspect of my invention, the strip 15 is formed by the mill rollers 11 and 12 so as to have a ridge 97 on each side which together have cross-sections generally conforming to the shape of the space defined by the cavities 92c in the die members. When the die members are closed they are forced through the ridges 97 and through the strip 15—any excess material flowing back and remaining attached to the strip when the cut-off surface 77 on one die member engages its companion abutment on the other die member.

The strip 15 with the ridges 97 on both sides may be formed by providing grooves 98 in the mill rollers, see Fig. 1. When the ridge is to be formed on only one side of the strip, only one of the mill rollers need to be grooved.

Where each of the die members of Figs. 6 through 9, for example, has a cavity or set of cavities, and where it is important that the cavities or sets of cavities be registered or accurately aligned with each other, it is preferable to provide registering means on the die members to effect such alignment. In these figures such registering means comprises tapered projections 99 on the one die member, shaped and positioned to engage a conical surface 100 on the other die member when both members are together in the position of Fig. 7. The projections 99 function to nest the cooperable die member and to automatically center it, and in so doing they pierce the sheet material which is being molded, and displace the material as indicated at 101 in Fig. 7. It will be understood that the projections 99 engage the conical surface 100 with sufficient force to completely squeeze out all of the moldable material from the points of engagement, and therefore accurately align the die members.

In Figs. 6 through 9 the registering or aligning means comprising the projections 99 and conical surface 100 is shown on the outside or exterior of the working portions of the die members. This means may also be located inside of the working surfaces of the die members, as illustrated in Fig. 9A. In this figure, tapered projections 102 cooperate with a conical surface 103 to accurately align the die members and register the cooperable cavities thereof.

The die aligning features illustrated in Figs. 6, 6A, 7, 9 and 9A are described and claimed in my copending application Serial No. 422,930, filed April 13, 1954. The means disclosed herein for operating the die members are described and claimed in my copending application Serial No. 598,479, filed July 17, 1956.

Variations and modifications may be made within the scope of the claims and portions of the improvements may be used without others.

I claim:
1. The method of molding articles of plastic material which comprises placing a strip of plastic moldable material between cooperating die members forming between them a molding cavity, bringing the die members together to sever from a part of the strip a blank and deposit it in said die members, immediately separating said die members and removing the remaining portion of the strip from which the blank was severed from between the open die members while leaving the blank in one of them, again closing the die members and maintaining them closed for sufficient time to mold the blank to finished shape and dimensions within the die cavity and then separating the die members and discharging the molded article therefrom.

2. The method of molding articles of plastic material which comprises placing a strip of plastic moldable material between cooperating die members forming between them a molding cavity, bringing the die members together to sever from a part of the strip a blank and deposit it in said die members, immediately separating said die members and removing the remaining portion of the strip from which the blank was severed from between the die members while retaining the blank in one of the die members, closing the die members, repeatedly opening and closing the die members to permit escape of gases and excess material therefrom and finally maintaining the die members closed for sufficient time to mold the blank to finished shape and dimensions within the die cavity and then separating the die members and discharging the molded article therefrom.

3. The method of molding articles of plastic material which comprises placing a continuous strip of plastic moldable material between advancing pairs of axially aligned cooperating die members forming between them a molding cavity, bringing the pairs of die members successively together to sever from a part of the strip a blank and deposit it in said die members, at the same time separating the die members of an adjacent previously closed pair and removing the remaining portion of the strip from which the blank was severed from between the opened die members while leaving the blank in one of them, at the same time closing the die members of a previously separated blank carrying pair and maintaining them closed for sufficient time to mold the blank to finished shape and dimensions within the die cavity and at the same time opening the die members of a pair which have been closed for said sufficient time and discharging the molded article therefrom.

4. The method of molding articles of plastic material which comprises producing a continuous strip of plastic moldable material, guiding the strip between advancing pairs of axially aligned cooperating die members forming between them a molding cavity, bringing the pairs of die members successively together to sever from a part of the strip a blank and deposit it in said die members, at the same time separating the die members of an adjacent previously closed pair and removing the remaining portion of the strip from which the blank was severed from between the opened die members while leaving the blank in one of them, at the same time closing the die members of a previously separated blank carrying pair and maintaining them closed for sufficient time to mold the blank to finished shape and dimensions within the die cavity and at the same time opening the die members of a pair which have been closed for said sufficient time and discharging the molded article therefrom, and guiding the blanked out strip to its point of origin and using it to in part produce the continuous strip.

5. The method of molding articles of plastic material requiring a prolonged vulcanization period which comprises placing a strip of warmed molding material between heated cooperating die members forming between them a molding cavity, bringing the die members together to sever from said strip a blank and deposit it in one of said die members, separating said die members before the material of the blank flows substantially in response to the heat of the die members and then removing the strip from between the separated die members leaving the blank in the die member in which it is deposited, bringing the die members together again under pressure and maintaining the cavity between them closed for sufficient time for the blank to respond to the heat of the die members and flow to fill the cavity and semi-cure in finished shape and dimensions, then separating the die members and discharging the molded article therefrom, and finally subjecting the discharged article to vulcanizing heat for the prolonged period required to vulcanize the material.

6. The method of molding articles of plastic material requiring a prolonged vulcanization period wherein a continuous advancing series of pairs of cavity-forming die members are operated successively to thereby successively and continuously mold articles which comprises placing a strip of heated molding material between a continuously advancing series of pairs of heated cooperating die members, bring the die members of each pair together successively, each pair of dies severing a blank from said strip and depositing it in one of said die members of said pair of die members, at the same time separating a previously closed pair of die members before the material of the blank therein flows substantially in response to the heat of the die members and at the same time removing the strip from between the separated die members leaving the blank in the die member in which it is deposited, at the same time bringing the die members of a previously separated pair together again under pressure to form an article from the blank contained therein and thereafter semi-curing the article by maintaining the cavity between the die members closed for a determinate time sufficient for the article to respond to the heat of the die members, and flow to fill the cavity and assume finished shape and dimensions, at the end of said determinate time successively separating the die members to discharge the molded articles therefrom discharging the molded articles therefrom and finally collecting successively the discharged articles on a conveyor and subjecting them en masse to vulcanizing heat for the prolonged period required to vulcanize the material.

7. The method as defined in claim 6 in which the cavity is opened and closed several times during the initial part of the semi-curing step to permit escape of gases and excess material from the cavity as the article heats up.

8. The method as defined in claim 6 in which the removed strip from which the blank is removed is commingled with fresh material and plasticized and warmed to form a continuous strip to be guided to said die members.

9. The method of molding articles of plastic material which comprises placing a supply strip of material between a pair of cooperating molding die members relatively movable between opened and closed positions and having an article-molding cavity outlined by cut-off surfaces and a contiguous material-receiving cavity; said supply strip of plastic moldable material being positioned between said die members when opened at the entrance of the material-receiving cavity; moving the die members toward each other to press out from the supply strip and into the material-receiving cavity a portion having an area substantially greater than that outlined by said cut-off surfaces and substantially in excess in volume to that of the article to be molded; leaving the pressed out portion of the material in the material-receiving cavity attached to said supply strip; continuing the movement of said die members toward each other to cause a portion of said material in said material-receiving cavity to be forced into the article-molding cavity of the die members to fill the same; and by the final movement of the die members to closed position bringing said cut-off surfaces together to sever the material in the article-molding cavity from that in the material-receiving cavity, whereby when the die members are opened the material in the material-receiving cavity is removable from the die members intact with the supply strip leaving the material in the molding cavity.

10. The method as defined in claim 9 which includes the further steps of separating the die members; removing the strip and the attached material from between the die members; and finally removing the blank from the cavity.

11. In the method of molding articles of settable plastic moldable material in which a strip of moldable material of determinate thickness is placed between cooperating die members forming between them a molding cavity and a contiguous material receiving cavity said cavities together forming a determinate volume in excess of the volume of a blank which would be taken from the strip by the blanking operation of the molding cavity of the die members, the steps of pressing out from the strip a portion having a volume in excess of that of the molding cavity, squeezing said portion through a confined space into said cavities to fill the same, bringing the die members together along a line of closure to close the molding cavity and form a blank, and, while permitting the blank to remain attached to the strip, severing the portion in said confined space in the material-receiving cavity from the portion in the molding cavity at the line of closure of the molding cavity, separating the die members, removing the strip and the attached pressed out portion from between the die members leaving the blank in the molding cavity, bringing the die members together again under pressure and maintaining the cavity closed for sufficient time to set the material to desired shape and size.

12. In the method of molding articles of settable plastic moldable material in which a strip of moldable material of determinate thickness is placed between cooperating die members forming between them a molding cavity and a contiguous material receiving cavity said cavities together forming a determinate volume in excess of the volume of a blank which would be taken from the strip by the blanking operation of the molding cavity of the die members, the steps of pressing out from the strip a portion having a volume in excess of that of the molding cavity, squeezing said portion through a confined space into said cavities to fill the same, bringing the die members together along a line of closure to close the molding cavity and form a blank, the excess material flowing outwardly through said confined space as the cavity is closed, and severing the portion in said confined space remaining attached to the strip from the portion in the molding cavity at the line of closure of the molding cavity, separating the die members, removing the strip and the attached pressed out portion remaining attached to the strip from between the die members leaving the blank in the molding cavity, bringing the die members together again under pressure and maintaining the cavity closed for sufficient time to set the material to desired shape and size.

13. In the method of molding articles of settable plastic moldable material in which a strip of moldable material of determinate thickness is placed between co-operating die members forming between them a molding cavity and a contiguous material receiving cavity said cavities together forming a determinate volume in excess of the volume of a blank which would be taken from the strip by the blanking operation of the molding cavity of the die members, the steps of pressing out from the strip a portion having a volume in excess of that of the molding cavity, squeezing said portion through a confined space into said cavities to fill the same, bringing the die members together along a line of closure to form a blank and sever the portion in said confined space in the material-receiving cavity from the portion in the molding cavity at the line of closure of the molding cavity leaving the portion in the confined space attached to the strip, separating the die members, removing the strip from between the die members leaving the blank in the molding cavity, bringing the die members together again under pressure and maintaining the cavity closed for sufficient time to set the material to desired shape and size.

14. In the method of molding articles of settable plastic moldable material in which a strip of moldable material of determinate thickness is placed between cooperating die members forming between them a molding cavity and a contiguous material receiving cavity said cavities together forming a determinate volume in excess of the volume of a blank which would be taken from the strip by the blanking operation of the molding cavity of the die members, the steps of pressing out from the strip a portion having a volume in excess of that of the molding cavity, squeezing said portion through a confined space into said cavities to fill the same, bringing the die members together along a line of closure to close the molding cavity, form a blank and sever the portion in said confined space in the material-receiving cavity from the portion in the molding cavity at the line of closure of the molding cavity leaving the portion in the confined space attached to the strip, separating the die members, removing the strip from between the die members leaving the blank in the molding cavity, bringing the die members together again under pressure and maintaining the cavity closed for sufficient time to set the material to desired shape and size of the article.

15. The method as defined in claim 14 in which the plastic material is of a kind requiring curing and the article is discharged from the cavity and subjected to complete curing of the material.

16. The herein described method of molding articles of plastic material having a hole extending completely therethrough in a direction parallel to the closing movements of relatively movable die members forming an article-molding cavity between them, the steps of placing a supply strip of moldable plastic material between said die members when open, closing said die members to remove a portion of the molding supply strip and mold an article in the cavity therefrom, and at the same time with a hollow die part forming a hole in the article being molded by separating a portion of the material of the article therefrom by cutting completely through the article on a line defining the margin of the hole, depositing said separated portion in the hollow die part, separating the die members, withdrawing the hollow die part and the separated hole-forming portion deposited therein from the molded article, and accumulating the separated hole-forming portions in the hollow die part.

17. The hereindescribed method of molding articles of heat curable material having a hole extending through the same in a direction parallel to the closing movement of relatively movable heated die members having an article molding cavity between them, the steps of forming the article in the mold cavity and with a hollow die part forming a hole in the article and cutting-off the molding material within the cavity on a line defining the margin of the hole leaving the material trapped within the hollow die part separated from the article, separating said die members, discharging the material in the hollow die part, pressing the die members together again, and continuing the molding operation of the article to semi-cure the same.

18. The method as defined in claim 16, which also includes discharging the excess accumulations from the hollow part through a lateral channel in the die member leading to the exterior thereof.

19. The method as defined in claim 16, which includes accumulating from repeated molding operations the separated hole-forming portions in the hollow die part to fill the same and when said hollow die part is full with the material contained therein extruding the article-forming material away from the end of the hollow die part as the die cavity is closed and the material in the article-forming cavity is cut off by the hollow die part.

20. Apparatus for molding articles of plastic material comprising a rotatable drum; a plurality of pairs of axially aligned die members relatively movable between opened and closed positions mounted on the drum in closely spaced relation and movable by said drum successively past charging and discharging stations; means for guiding a continuous strip of plastic molding material between the die members in opened position at the charging station; means for closing the die members on the said strip to blank a portion of the material of the strip therefrom; means for opening the die members to free the strip therefrom, the blank being left in one of the die members; means for closing the die members on the blank and maintaining them closed until they reach the discharge station; means for opening the die members at the discharge station; and means for there discharging the molded articles.

21. A pair of cooperating molding die members relatively movable between opened and closed positions comprising a first die member and a second die member having walls forming two cavities, one an article-molding cavity outlined by cut-off surfaces and the other a contiguous material-receiving cavity outwardly and axially offset from the molding cavity; means for positioning a supply strip of plastic moldable material between said die members, when opened, at the entrance of the material-receiving cavity; cooperating surfaces on said first die member and the wall of the material-receiving cavity shaped to press out from the supply strip of moldable material and into the material-receiving cavity a portion having an area substantially greater than that outlined by said cut-off surfaces and substantially in excess in volume to that of the article to be molded; means for moving said die members toward each other to perform said pressing out operation, said cooperating surfaces of the die members in said material-receiving cavity being shaped so that the pressed out portion of the material in the material-receiving cavity remains attached to said supply strip of moldable material, said first die member having means whereby continued movement of said die members toward each other causes a portion of said material in said material-receiving cavity to be forced into the article-molding cavity of the die members to fill the same, the first die member having cut-off surfaces cooperating with the cut-off surfaces of the second die member so that the final movement of the die members to closed position brings said cut-off surfaces together to sever the material in the article-molding cavity from that in the material-receiving cavity whereby when the die members are opened the material remaining in the material-receiving cavity is removable from the die members intact with the supply strip leaving the material in the molding cavity.

22. The invention as defined in claim 21 in which the strip material pressing out means includes a plunger on the first die member and a cooperating cylinder on the second die member.

23. The invention as defined in claim 22 in which the plunger is slightly smaller in diameter than the cylinder to provide space for back-flow of material pressed out from the strip in excess of that needed to fill the article-forming cavity.

24. A pair of cooperating molding die members for molding articles of plastic material relatively movable between closed and opened positions having an annular article-forming cavity between them when closed, each die member having narrow end surfaces forming inner and outer cut-off surfaces for abutting engagement with like surfaces on the companion die member, means for placing a strip of plastic molding material between said die members when in opened position, said inner and outer cut-off surfaces defining said annular cavity, the outer cut-off surfaces determining the area of a blank taken from the strip of molding material and the inner cut-off surfaces separating the trapped material within them from the article molded in the article-forming cavity when the die members are brought together and closed, one of said die members having a recess large enough to receive free of molding pressure the portion of the material trapped within said inner cut-off surfaces, and means for forcing the trapped material away from said inner cut-off surfaces into said recess in one of the die members.

25. The invention as defined in claim 24 in which there is means for ejecting the said trapped material from said recess.

26. Apparatus for molding articles of plastic material having a hole extending completely therethrough, a pair of relatively movable die members forming an article-molding cavity between them, means for placing a supply strip of moldable plastic material between said die members when open, means for closing said die members to remove a portion of the molding supply strip and mold an article in the cavity therefrom, one of said die members having a tublar projection for forming a hole in the article to be molded positioned to enter the molding cavity and separate a portion of the material of the article therefrom, the leading end of the tubular projection having a cutting edge to cut completely through the article on a line defining the margin of the hole, said tubular projection having a bore to receive and hold said separated portion, and means for separating the die members and withdrawing the tubular projection and the separated hole-forming portion deposited therein from the formed article.

27. The method of molding articles of vulcanizable plastic material which comprises the steps of placing a strip of said vulcanizable material between cooperating heated die members forming between them a molding cavity, bringing the die members together to sever from a part of the strip a blank and deposit it in said die members, immediately separating said die members and removing the remaining portion of the strip from which the blank was severed from between the open die members while leaving the blank in one of them, again closing the die members and maintaining them closed for a sufficient time to mold and partially cure the blank to finished shape and dimensions within the die cavity, separating the die members, discharging the partially cured article therefrom, and passing the molded article through a vulcanizing chamber to complete the curing of the article.

28. The herein described method of molding articles having a hole extending through the same in a direction parallel to the movement of the relatively movable die members having an article molding cavity between them, the steps of successively forming articles in a molding cavity having a cooperating hollow projection engaging an abutment within the confines of the cavity to squeeze therebetween the molding material therein on a line defining the margin of the hole leaving the material trapped within said line separated from the article and collecting said trapped material within the hollow projection deposited therein during the successive molding operations.

References Cited in the file of this patent

UNITED STATES PATENTS

| | | |
|---|---|---|
| 696,254 | Nash | Mar. 25, 1902 |
| 1,619,210 | MacLaren | Mar. 2, 1927 |
| 1,624,224 | Easterlin | Apr. 12, 1927 |
| 1,751,646 | Nieman | Mar. 25, 1930 |
| 1,905,047 | Norin | Apr. 25, 1933 |
| 2,072,349 | Wayne | Mar. 2, 1937 |
| 2,339,850 | Goodale | Jan. 25, 1944 |
| 2,573,365 | Scholes et al. | Oct. 30, 1951 |
| 2,593,438 | Gora | Apr. 22, 1952 |
| 2,589,419 | Moncrieff | Mar. 18, 1952 |

UNITED STATES PATENT OFFICE
CERTIFICATE OF CORRECTION

Patent No. 2,864,123                                                  December 16, 1958

Henry Z. Gora

It is hereby certified that error appears in the printed specification of the above numbered patent requiring correction and that the said Letters Patent should read as corrected below.

Column 4, line 43, for "of" read -- on --; column 9, line 28, for "80a" read -- 89a --; line 67, for "need" read -- needs --; column 11, line 51, for "bring" read -- bringing --; column 15, line 51, for "tublar" read -- tubular --.

Signed and sealed this 14th day of April 1959.

(SEAL)
Attest:

KARL H. AXLINE
Attesting Officer

ROBERT C. WATSON
Commissioner of Patents